United States Patent
Seto et al.

(12) 
(10) Patent No.: US 6,299,723 B1
(45) Date of Patent: Oct. 9, 2001

(54) ANTI-AIRLOCK APPARATUS FOR FILTERS

(75) Inventors: Hideaki Seto; Haruhiko Yamamoto; Nobuyoshi Sato; Kyoko Saito, all of Tsukuba (JP)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/321,659

(22) Filed: May 28, 1999

(30) Foreign Application Priority Data

May 29, 1998 (JP) .................................................. 10-150093

(51) Int. Cl.⁷ .................................................... B01D 35/00
(52) U.S. Cl. ............................................. 156/345; 134/110
(58) Field of Search ............................... 156/345; 210/188, 210/194; 134/10, 109, 110, 111

(56) References Cited

U.S. PATENT DOCUMENTS

| | | | |
|---|---|---|---|
| 5,322,082 | * | 6/1994 | Shibano ................................ 134/186 |
| 6,059,886 | * | 5/2000 | Shibano .................................... 134/1 |

* cited by examiner

*Primary Examiner*—Thi Dang

(57) ABSTRACT

An anti-airlock apparatus for filters comprises a process bath for processing wafers, a filtration unit incorporating a filter for preliminarily filtering a process solution before said processing and connected to a first deaeration line, and a tank body provided on the primary side or the filtration unit and connected to a second deaeration line, wherein at least said filtration unit and tank body are connected to each other via a pipeline, and a valve of the first deaeration line and a valve of the second deaeration line are separately operated and said first and second deaeration lines are directly connected to the most upstream side of the process solution.

14 Claims, 6 Drawing Sheets

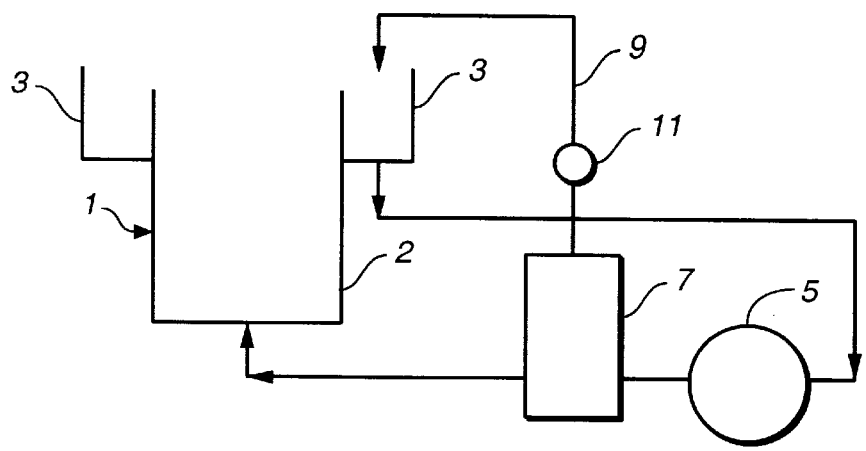
FIG._1
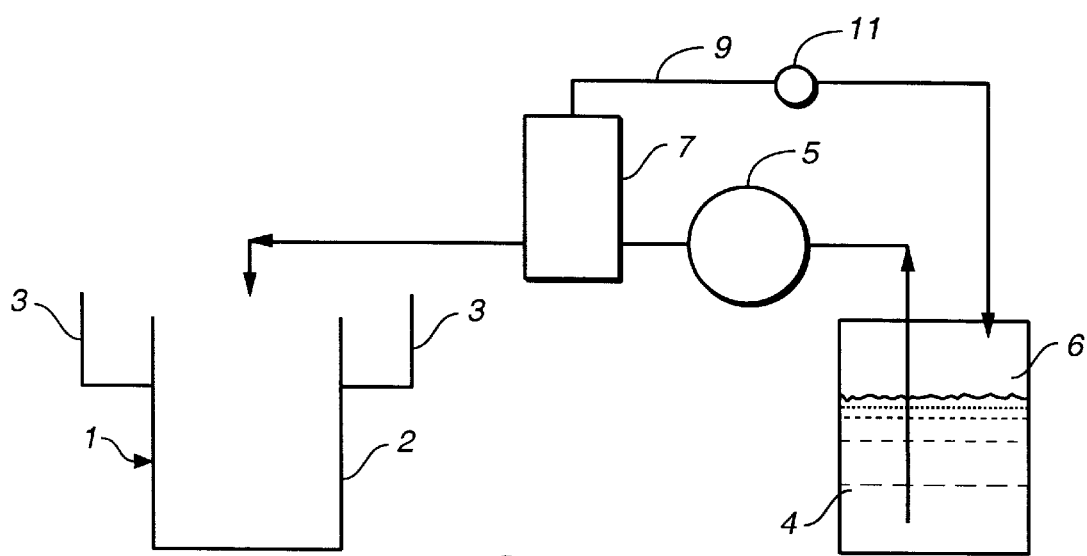
FIG._2

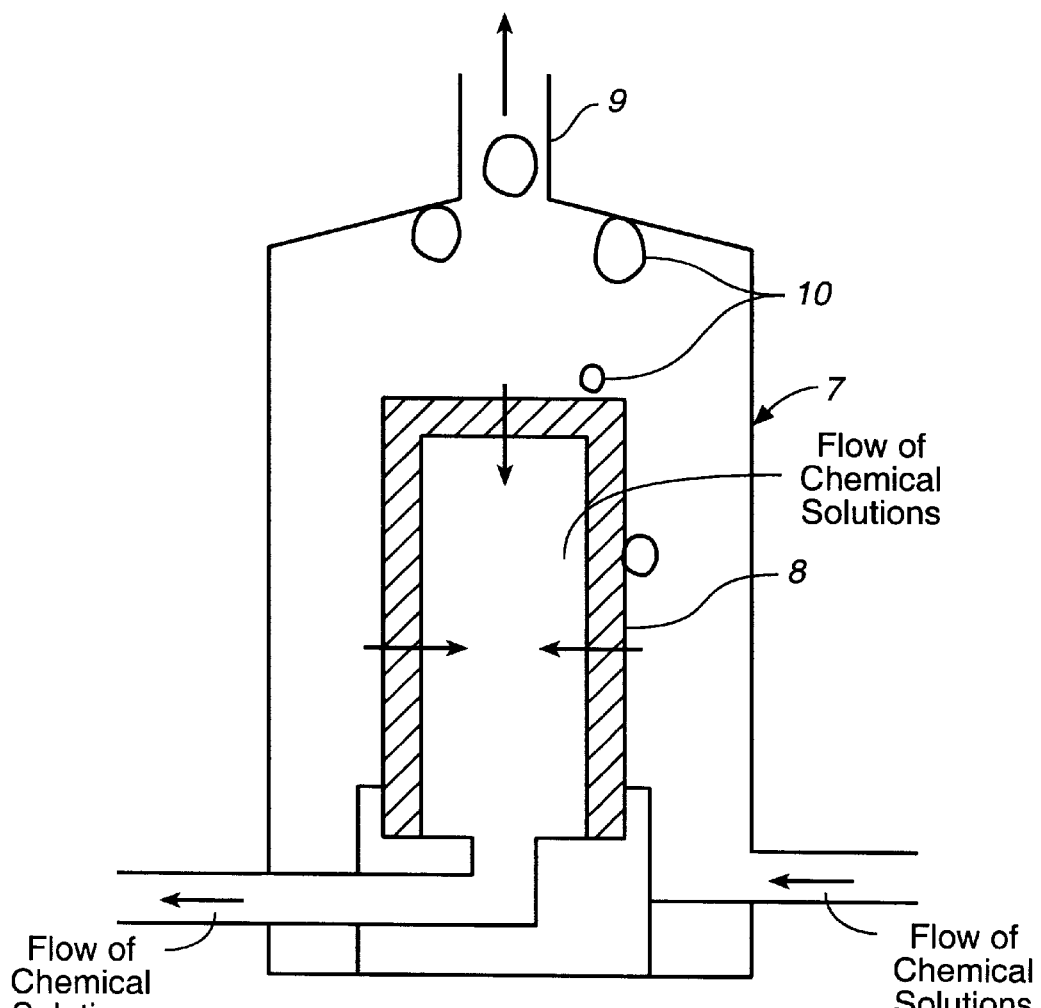
FIG._3

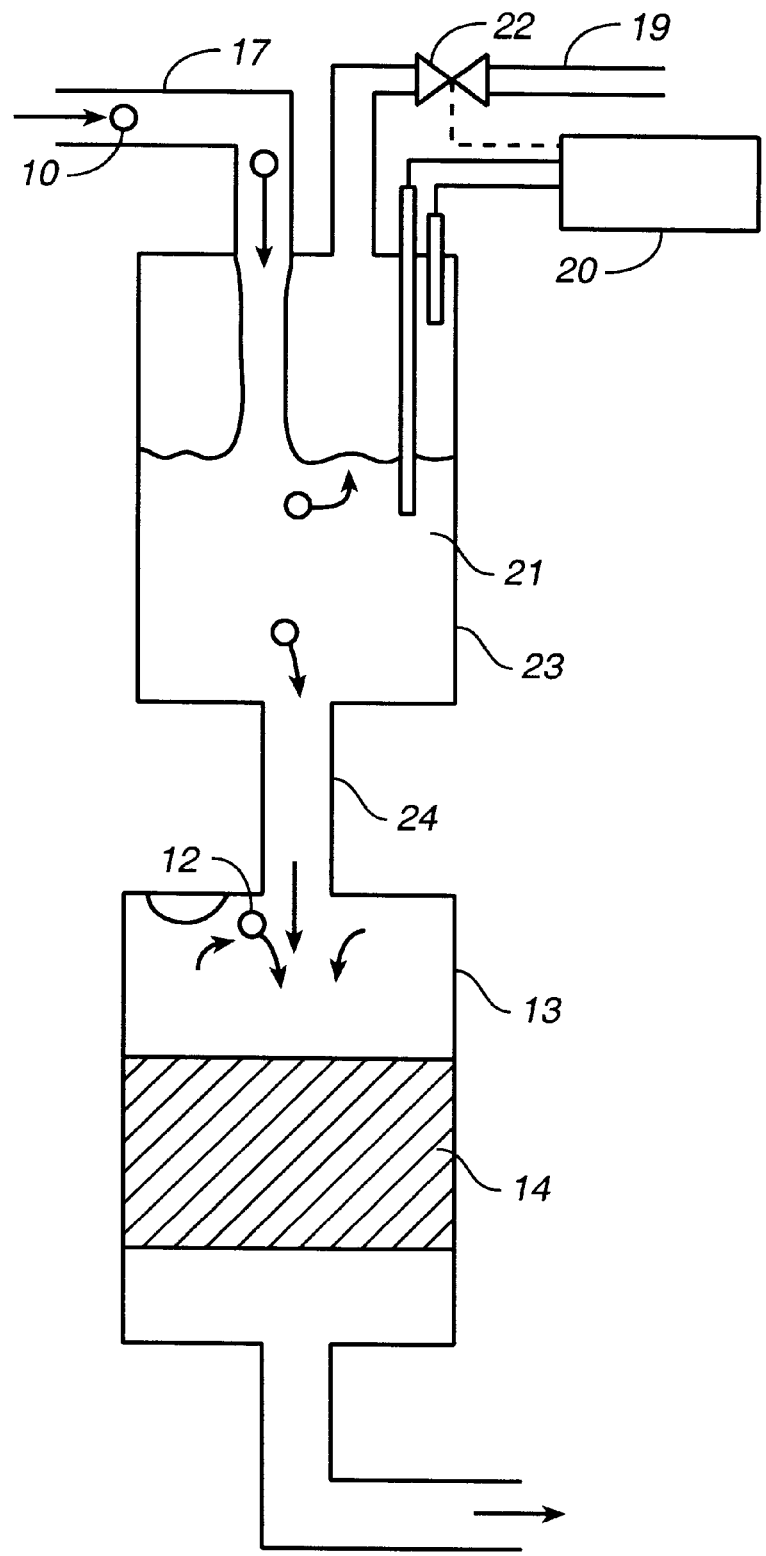
FIG._4

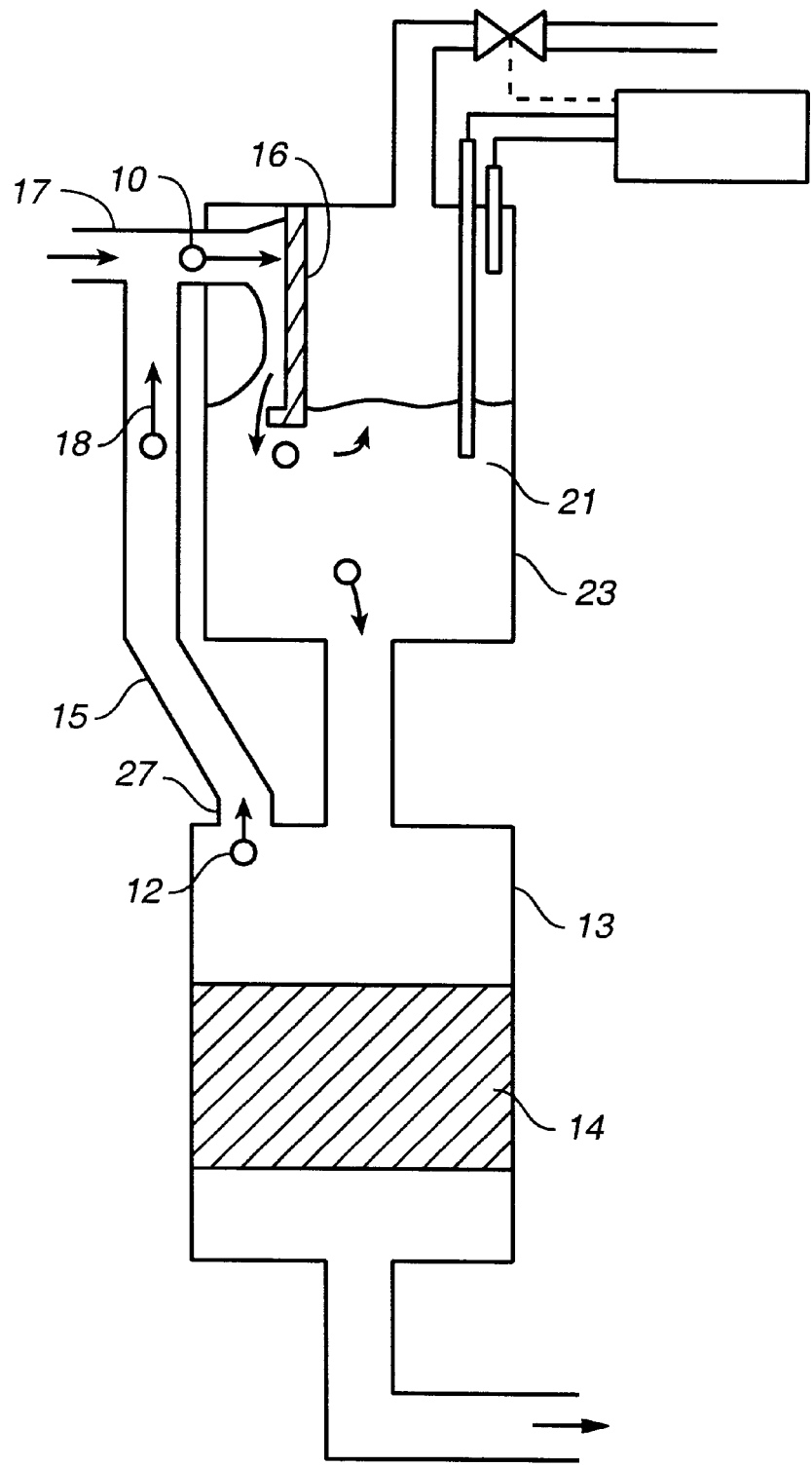
FIG._5

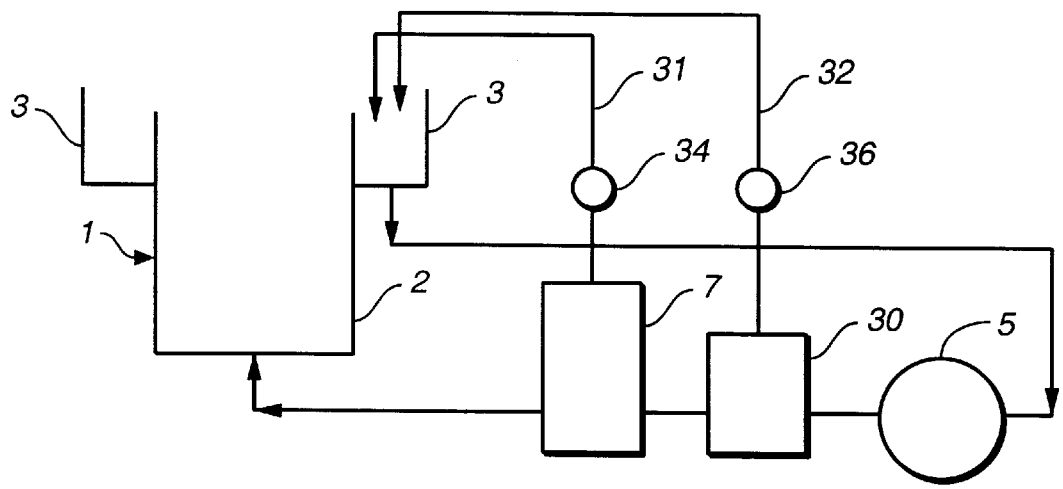
FIG._6
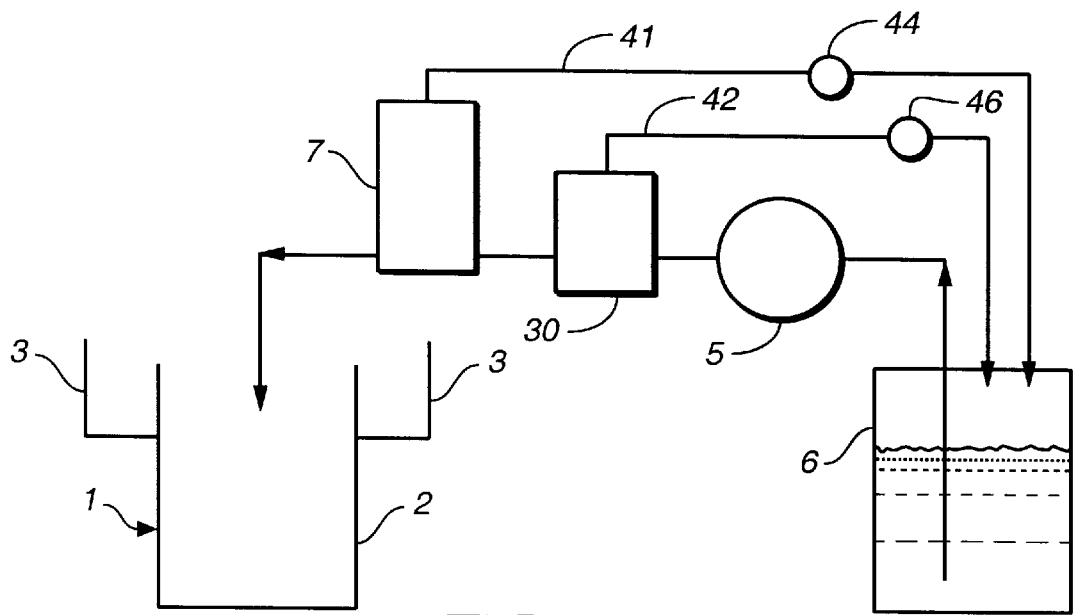
FIG._8

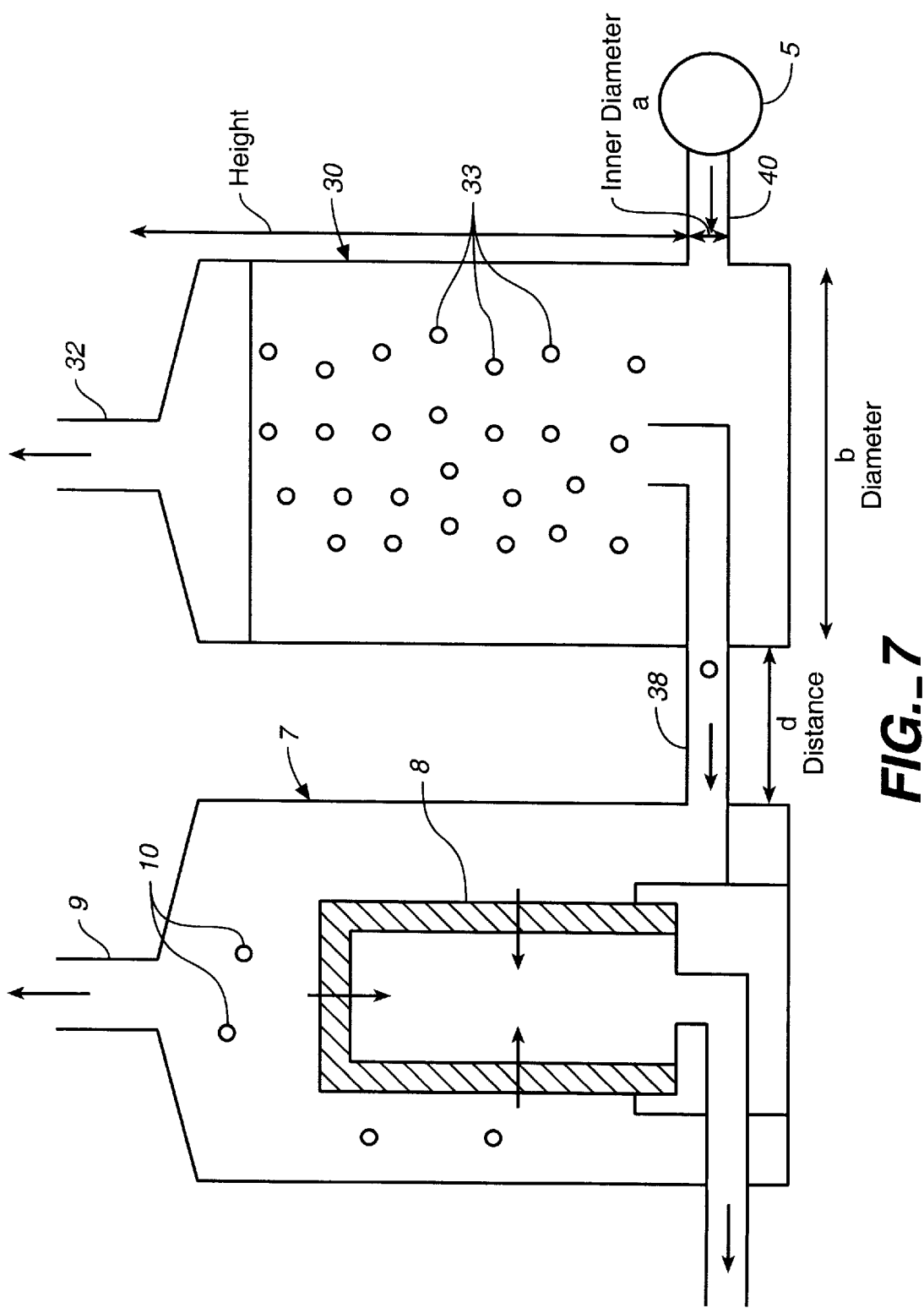
FIG._7

US 6,299,723 B1

ANTI-AIRLOCK APPARATUS FOR FILTERS

CLAIM OF FOREIGN PRIORITY UNDER 35 U.S.C. §119

This patent application claims priority under 35 U.S.C. section 119 to Japanese Patent Application No. 150093/98, filed on May 29, 1998.

FIELD OF THE INVENTION

The present invention relates to an apparatus that prevents dehydration and airlock of filters which is a significant problem in both wet processes such as wet etching, wet cleaning, wet scrubber processes, and dry processes such as Chemical Mechanical Polishing (CMP) or spin coater processes and spin developer processes during manufacturing of semiconductors or liquid crystals or the like.

BACKGROUND OF THE INVENTION

FIG. 1 is a flow diagram that illustrates filtering of a chemical solution in a conventional chemical solution circulation system. A chemical solution is circulated by suction of a pump 5 front an outer bath 3 of a chemical solution bath 1 and supplied to the primary side of a filter in a filtration unit 7 via the pump 5. Then, the chemical solution passes through the filter in the filtration unit 7 to reach the secondary side of the filter during which rubbish and particles in the chemical solution are retained by the filter. The chemical solution, freed of rubbish and particles, reaches an inner bath 2 of the chemical solution bath 1, where it acts on wafers (not shown) to etch or wash them.

FIG. 2 is a flow diagram that illustrates filtering in a chemical solution supply system, in which a chemical solution 4 is drawn by pump 5 from a chemical solution bottle 6 and supplied to a chemical solution bath I through a Filtration unit 7. Since rubbish and particles are retained by a filter in the filtration unit 7 the supplied chemical solution is cleaned. Alternatively, the chemical solution 4 may be pressure-fed by $N_2$ gas or the like from the chemical solution bottle 6 to the filtration unit 7.

Chemical solution circulation system or chemical solution supply system often contain bubbles, air or the like (hereinafter collectively referred to as air) which are generated by the operation of the pump, $N_2$ gas for pressure feeding, leakage at pipeline joints, the variation in the pipeline diameter or other factors. Thus, air in the chemical solution frequently reaches the primary side of the filter in the filtration unit 7.

Some air does not enter the filter pores 8 in the filtration unit 7, but rather coalesces into air particles 10 that gather at the top of the filtration unit 7 as shown in FIG. 3. These air particles are conventionally recycled to the outer bath 3 of the chemical solution bath 1 or the chemical solution bottle 6 by opening and closing a deaeration valve 11 provided in the deaeration line 9 connected to the top of the filtration unit 7 (FIGS. 1 and 2).

However, the remaining air is deposited on the membrane of filter 8 or is forced into the membrane of the filter 8 by the pump pressure or pressure feeding. The air forced into pores in the membrane of the filter 8 is stabilized there and gradually blocks the pores of the filter 8. Alternatively, the filter pores may also be blocked with rubbish, particles, etc.

Such blockage of the filters with air (airlock phenomenon) decreases the filtration flow rate of the circulating chemical solutions i.e. a decrease in the amount filtered per unit time. Therefore, the ability to remove particles from a chemical solution bath by filtration is reduced. These particles then adhere to products to constitute a major cause of low product yields. In extreme situations, no circulation takes place so that the resultant pressure damages the pump.

With chemical solution supply filters, the lowered filtration flow rate may lead to a longer supply period, and accordingly a longer solution replacement period in the system. In extreme cases, no chemical solution is supplied to the system.

Japanese Patent Application No. 75012/89 and Japanese Patent Application No. 127006/89 disclose examples of chemical solution filtration systems to preventing airlock phenomenon. The chemical solution filtration system disclosed in Japanese Patent Application No. 75012/89 comprises an air reservoir 23 connected via a connecting pipeline 24 to the primary stage of a filtration unit 13 that incorporates a filter membrane 14. The air reservoir 23 includes a deaeration line 19 and a liquid level sensor 20, as shown in FIG. 4.

In this system, a deaeration valve 22 provided in the deaeration line 19 is opened when the liquid level sensor 20 detects that the liquid level on the primary side of the filter has been lowered to a determined level by the air introduced from a chemical solution inlet 17. When the liquid level sensor 20 detects a rise in liquid level, on the contrary, the deaeration valve 22 is closed.

In this system, however, chemical solutions are pumped from the chemical solution inlet 17 through the air reservoir 23 and the connecting pipeline 24 to the primary side of the filter 14. Therefore, the air 12 that reaches the primary side of the filter 14 in the filtration Unit 13 or is generated from a bubble-forming chemical solution in the filtration unit 13 cannot not reach the air reservoir 23 through the connecting pipeline 24 because of the flow of the chemical solution.

The chemical solution filtration system, disclosed in Japanese Patent Application No. 127006/89, comprises a deaeration port 27 located at the top of a filtration unit 13. Filtration unit 13 incorporates a filter membrane 14, an air reservoir 23 and an air recycle line 15 connected between the deaeration port 27 and chemical solution inlet 17 of the air reservoir 23, as shown in FIG. 5. In this system, the air 12 that reaches filtration unit 13 or is generated in the filtration unit 13 flows in direction 18 through the air recycle line 15 to the air reservoir 23.

In this system however, chemical solutions can reach the filtration unit either by striking the baffle 16 or going along the air recycle line 15. Thus, it was found that the air 12 could not rise up against the flow of chemical solutions reaching the primary side of the filter membrane 14. The flow of chemical solutions prevented air 12 from escaping through the air recycle line 15 which considerably reduced the deaeration effect.

Therefore, neither of the above two systems could effectively overcome airlock phenomenon.

SUMMARY OF THE INVENTION

In order to overcome the above problems, an anti-airlock apparatus for filters is provided that comprises a process bath for processing wafers, a filtration unit incorporating a filter for preliminarily filtering a process solution connected to a first deaeration line, and a tank body having a determined volume provided on the primary side of said filtration unit and connected to a second deaeration line. At least the filtration unit and tank body are connected to each other via a pipeline, and the first and second deaeration lines are separately operated and arc directly connected to the most upstream side of the process solution.

Preferably, said tank body has a internal process solution transfer length between about three times and about twenty times the inner diameter of the pipeline and an air transfer height between three times and about fifty times the inner diameter of the pipeline.

The anti-airlock apparatus for filters of the present invention can be used in circulation or supply systems for wet processes such as wet etching, wet cleaning, wet scrubber process, and non-wet processes such as CMP, spin coater processes, spin developer processes, or the like.

Suitable process solutions preferably include chemical solutions ($NH_4OH$, $H_2O_2$, HF, $HNO_3$, $H_3PO_4$, HCl, $H_2SO_4$, buffered HF, isopropyl alcohol, etc.), stripping agents, organic solvents, surfactants solutions, pure water, photoresist (cyclized polyisoprene, novolak resins, styrene, etc.), developers (organic solvents, organic alkalis, organic alkalis containing surfactants, etc.), CMP slurries (based on iron nitrate, hydrogen peroxide, manganese dioxide, silica, alumina, cerium oxide, etc.), anti-reflective solvents used for ARC (Anti-Reflective Coating), TAR (Top Anti-Reflection), or the like.

BRIEF DESCRIPTION OF THE DRAWINGS

FIG. 1 is a schematic flow diagram of filtering of chemical solutions in a conventional chemical solution circulation system.

FIG. 2 is a schematic flow diagram of filtering of chemical solutions in a conventional chemical solution supply system.

FIG. 3 is an enlarged view showing the flow of air and the flow of chemical solutions in a conventional filtration unit.

FIG. 4 is a flow diagram of a conventional chemical solution circulative filtration system.

FIG. 5 is a flow diagram of another conventional chemical solution circulative filtration system.

FIG. 6 is a schematic view showing an example of the anti-airlock apparatus for filters according to the present invention.

FIG. 7 is an enlarged view showing a tank body and a filtration unit used in the anti-airlock apparatus for filters according to the present invention.

FIG. 8 is a schematic view showing another example of the anti-airlock apparatus for filters according to the present invention.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

FIG. 6 is a schematic view showing an example of the anti-airlock apparatus according to the present invention. In this example, a filtration unit 7 is provided upstream of a process bath 1 for wet processing wafers (not shown), and a tank body 30 is provided on the primary side of the filtration unit 7. The upstream side of the tank body 30 is connected to a pump 5. The process bath 1, filtration unit 7, tank body 30 and pump 5 are successively connected to via pipelines having an inner diameter of about 10 to 50 mm which are made from Teflon or the like. A first deaeration line 31 leading to an outer bath 3 of the process bath 1 is connected to the top of the filtration unit 7 at a upstream side of the process solution so that air can be directly recycled to the outer bath 3. Similarly, a second deaeration line 32 is connected to the tank body 30 so that air can be directly recycled to the outer bath 3 of the process bath 1. The first deaeration line 31 and second deaeration line 32 are equipped with valves 34 and 36, respectively, so that they can be separately operated for deaeration.

FIG. 7 is an enlarged view showing the filtration unit 7 and tank body 30 used in the anti-airlock apparatus of the present invention. Filter 8 made from polypropylene, polyethylene or Teflon or the like is incorporated in the cylindrical filtration unit 7, and the tank body 30 is connected to the primary side of said filter 8 via a pipeline 38. The tank body 30 is connected to the pump 5 via a pipeline 40. The tank body 30 may be any shape such as cylinder, cube, rectangular parallelepiped or the like. In the situation where the tank body has a cylindrical shape as shown in FIG. 7, its diameter b is preferably between about three times and about twenty times the inner diameter a of the pipeline 40. The height C of the tank body is preferably between about three times and about fifty times the inner diameter a. Similarly, when the tank body is a cube or rectangular parallelepiped, the sides and the height are preferably within the ranges mentioned above.

The diameter or each side of the bottom face less than three times has no effect because the distance between the inlet and the outlet of the tank body 30 is so short that air 33 is flowed with the process solution from the outlet of the tank body 30 to the primary side of the filter 8 before it floats tip by buoyancy. If the diameter or each side of the bottom face is more than twenty times, the effect is not improved but the compactness of the apparatus is impaired. The height less than three times has no effect because the accumulated air 33 is entrained by the flow of the process solution to the outlet. If the height is more than fifty times, the effect is not improved but the compactness of the apparatus is impaired.

The distanced between the filtration unit 7 and the tank body 30 is desirably within 1 m, most preferably within 15 cm. The distanced may be zero by joining the filtration unit 7 and the tank body 30. If the distance is longer than said upper limit, it is more likely that air will be generated from the pipeline 38 connecting the filtration unit 7 and the tank body 30 and deaeration in the tank body 30 comes to nothing. The tank body 30 has an effect by being connected immediately near the primary side of the filter 8, but it is less effective if a pump or other air-generating parts are connected between the filter 8 and the tank body 30.

The end of the pipeline 38 in the tank body 30 is upright to ensure that the process solution entering from the pipeline 40 can not directly go to the outlet of the tank body 30. The shape of the pipelines 38, 40 and their connection site to the tank body 30 are not specifically limited to those shown in FIG. 7 so far as they satisfy the above function. For example, the pipelines 38, 40 may not be arranged in alignment as shown in FIG. 7, but may be orthogonally arranged or connected to the tank body at different heights so that the process solution entering from the pipeline 40 can not directly leave the tank body 30. Alternatively, a baffle may be provided in the tank body 30 to serve this function.

The above filtration unit 7 and tank body 30 can be made from polypropylene, polyethylene, Teflon or the like.

Now, a process in accordance with a preferred embodiment of the present invention for preventing airlock of a filter using this apparatus is explained.

Referring to FIG. 6, a process solution containing air is at first drawn by the pump 5 from the outer bath 3 of the process bath 1 to enter the tank body 30 through the pump 5. Then, the process solution containing air 33 is separated, with the air 33 going to the top of the tank body 30 by buoyancy, as shown in FIG. 7. The air 33 is accumulated at the top of the tank body 30 until the deaeration valve 36 of FIG. 6 opens, and as soon as the valve 36 opens, the air is directly recycled to the outer bath 3 of the process bath 1 under the pressure of the pump 5. The process solution is sent to the primary side of the filter 8 of the filtration unit 7 via the pipeline 38 at the outlet side of the tank body 30. Then, the process solution is filtered through the filter 8 to reach the inner bath 2 of the process bath 1.

Some air 10 generated in the filtration unit 7 is accumulated at the top of the filtration unit 7 by buoyancy, and is directly recycled to the outer bath 3 of the process bath 1 as soon as the deaeration valve 34 opens.

The air 33 and 10 accumulated in the tank body 30 and filtration unit 7, respectively, can be discharged by opening the valves 36, 34, respectively, at regular intervals depending on the size of the filter, the circulation flow rate, the nature of the process solution used, etc.

In case where the process bath 1 has a volume of 40 L and runs at a circulation flow rate of 20 L/min with the pipeline 40 having a diameter of ¾ inch, the tank body 30 having dimensions of 165 mm in the diameter of the bottom face and 350 mm in height, and the deaeration lines 31, 32 having a diameter of ¼ inch using $NH_4OH:H_2O_2:H_2O=1:1:6$ (65° C.), the valves 36, 34 are preferably set to open for about 10 seconds every 3 minutes.

If the interval is shorter and the valve-opening period is too long, the amount of the process solution passing through the filter 8 per unit time unpreferably decreases. In the reverse case, the tank body 30 is filled up with air to lose effect. It is desirable to ensure that the filtration unit 7 and the tank body 30 are not deaerated at the same time.

This apparatus can effectively prevent airlock phenomenon of filters, because the air entering the filtration unit 7 can be greatly reduced by preliminarily passing the process solution through the tank body 30 before the process solution enters the filtration unit 7 to directly recycle the air 33 generated to the outer bath 3 of the process bath 1 via the deaeration line 32, and the air penetrating into the filtration unit 7 or generated in the filtration unit 7 can be directly recycled to the outer bath 3 of the process bath 1 via the deaeration line 31.

Moreover, the air to be recycled is not hindered by the flow of chemical solutions as in conventional systems to effectively accomplish deaeration, because the first deaeration line 31 and the second deaeration line 32 are separately operated by the valves 34, 36, respectively and the air is directly recycled to the outer bath 3 of the process bath 1.

Although the foregoing description relates to an example of the anti-airlock apparatus for filters in a process solution circulation system, the anti-airlock apparatus may also be used in a process solution supply system as shown in FIG. 8. In this case, both of a first deaeration line 41 and a second deaeration line 42 connected to a filtration unit 7 and a tank body 30, respectively, lead to a chemical solution bottle 6 at the most upstream side of process solutions so that air can be directly recycled to the chemical solution bottle 6. Deaeration operations can be independently accomplished by valves 44, 46 provided in the first deaeration line 41 and second deaeration line 42, respectively. In this case, airlock phenomenon can also be effectively prevented in the same manner as in the process solution circulation system.

The anti-airlock apparatus according to the present invention can prevent airlock phenomenon of filters, because a tank body having a determined volume is provided on the primary side of a filtration unit connected to a first deaeration line and is connected to a second deaeration line so that the air entering the filtration unit can be greatly reduced by preliminarily passing the process solution through the tank body before it enters the filtration unit to recycle the air generated via the second deaeration line, and the air penetrating into the filtration unit or generated in the filtration unit can be recycled via the first deaeration line.

Moreover, the air to be recycled is not hindered by the flow of chemical solutions as in conventional systems to effectively accomplish deaeration, because the first deaeration line and the second deaeration line are separately operated and are directly connected to the most upstream side of process solutions so that the air can be directly recycled to the outer bath of the process bath in a circulation system or a chemical bottle in a supply system.

The above tank body internally has a process solution transfer length three times or more but twenty times or less the inner diameter of the pipeline and an air transfer height three times or more but fifty times or less the inner diameter of the pipeline, whereby airlock phenomenon of filters can be more effectively prevented.

Therefore, the anti-airlock apparatus according to the present invention can improve the life of filters as well as the circulation or supply efficiency of process solutions by preventing airlock phenomenon of filters.

It also can improve product yields by preventing an increase of adhered particles due to a decrease of circulation efficiency.

EXAMPLE

The following example describes specific aspects of the invention to illustrate the invention and to aid those of skill in the art in understanding and practicing the invention. The example should not be construed as limiting the invention in any manner.

Experiments were performed using the anti-airlock apparatus for filters shown in FIGS. 6 and 7 in an RCA cleaning process (hereinafter referred to as RCA) for cleaning wafers in a semiconductor manufacturing plant.

The bath arrangement of this RCA includes a first bath for SC1 cleaning, a second bath for DIW QDR (DI water quick dump rinse), a third bath for SC2 cleaning, a fourth bath for hot DIW QDR, a fifth bath for final DIW rinse and a sixth bath for IPA drying.

Conditions of the first bath for SC1 cleaning involved the volume of the chemical solution bath 1 of 40 L, circulation flow rate of 20 L/min, the line diameter at the inlet and outlet of the filtration unit 7 of ¾ inch, the line diameter of the deaeration line of the filtration unit 7 of ¼ inch, and chemical solution used: $NH_4OH:H_2O_2:H_2O=1:1:6$ (65° C.).

Conditions of the third bath for SC2 cleaning involved the volume of the chemical solution bath 1 of 40 L, circulation flow rate of 20 L/min, the line diameter at the inlet and outlet of the filtration unit 7 of ¾ inch, the line diameter of the deaeration line of the filtration unit 7 of ¼ inch, and chemical solution used: $HCl:H_2O_2:H_2O=1:1:5$ (80° C.).

Both apparatus used a filter 8 made from Teflon having a length of 10 inch and a pore diameter of 0.1 $\mu$m.

At first, an acceleration experiment for confirming airlock phenomenon was performed by circulating the chemical solution without opening the deaeration valve of the filtration unit 7 under the above conditions of the chemical solution used before connecting the tank body.

As a result, the first bath showed that the filtration unit 7 was filled up with air at 31 minutes. After 63 minutes, no chemical solution was flowed to the secondary side of the filter 8. This is because airlock phenomenon occurred in the filter.

The third bath at a higher temperature such as 80° C. showed that the filtration unit 7 was Filled Lip with air at 27 minutes. After 54 minutes, no chemical solution was flowed to the secondary side of the filter 8.

After RCA cleaning in this state, particles adhered to wafers were counted by a particle counter to show that an average of 345 particles adhered to three wafers. Particles having a particle size of 0.3 μm or more were counted, and process conditions were SC1 cleaning for 10 minutes and SC2 cleaning for 10 minutes.

As the filter 8 having undergone air lock phenomenon could not be continually used, it was replaced with IPA (isopropyl alcohol) again and fitted in the filtration unit 7, then thoroughly washed with pure water to remove IPA, and the filtration unit 7 was connected to the tank body 30 to perform a similar experiment. During then, the deaeration valve 36 of the tank body 30 was set to open for 10 seconds every 3 minutes for both of the first and third baths, and the chemical solution was circulated without opening the deaeration valve 34 of the filtration unit 7 to equalize the conditions.

As a result, the first bath showed that only a quarter of the filtration unit 7 was occupied with air at the end of the experiment for 180 minutes. This is the air that was generated in the filtration unit 7 and accumulated therein. The circulation flow rate fell from 20 L/min to 17 L/min, but any airlock phenomenon occurred. The third bath was also tested up to 180 minutes, which showed the same level as that of the first bath.

After RCA cleaning in this state, particles adhered to wafers were counted by a particle counter to show that an average of 11 particles adhered to three wafers. Particles having a particle size of 0.3 μm or more were counted.

The tank body 30 used here had dimensions of 165 mm in the diameter of the bottom face, 350 mm in height, and ¾ inch in the diameter of the pipelines 38, 40 at the inlet and outlet.

These experiments revealed that the anti-airlock apparatus according to the present embodiments largely contribute to prevention of airlock phenomenon of filters.

Although the foregoing invention has been described in some detail to facilitate understanding, it will be apparent that certain changes and modifications may be practiced within the scope of the appended claims. Furthermore, it should be noted that there are alternative ways of implementing both the process and apparatus of the present invention.

Accordingly, the present embodiment are to be considered as illustrative and not restrictive, and the invention is not to be limited to the details given herein, but may be modified within the scope and equivalents of the appended claims.

What is claimed is:

1. An anti-airlock apparatus for filters comprising:
   a process bath for processing wafers,
   a filtration unit incorporating a filter for preliminarily filtering a process solution before said processing and connected with a first deaeration line, and
   a tank body having a determined volume provided on the primary side of the filtration unit and connected with a second deaeration line,
   wherein at least said filtration unit and tank body are connected with each other via a pipeline, and said first and second deaeration lines are separately operated and are directly connected with the most upstream side of the process solution.

2. An anti-airlock apparatus for filters according to claim 1, wherein said tank body internally has a process solution transfer length between about three times and about twenty times the inner diameter of the pipeline.

3. An anti-airlock apparatus for filters according to claim 2, wherein said tank body internally has an air transfer height between three times and about fifty times the inner diameter of the pipeline.

4. An anti-airlock apparatus for filters according to claim 1, wherein said apparatus is configured to be used in circulation or supply systems for wet processes.

5. An anti-airlock apparatus for filters according to claim 4, wherein said apparatus is configured to be used in wet processes selected from wet etching, wet cleaning, wet scrubber process.

6. An anti-airlock apparatus for filters according to claim 1, wherein said apparatus is configured to be used in circulation or supply systems for non-wet processes.

7. An anti-airlock apparatus for filters according to claim 6, wherein said apparatus is configured to be used in non-wet processes selected from CMP, spin coater processes, and spin developer processes.

8. A semiconductor wafer processing system comprising:
   a process solution comprising one or more chemical solutions selected from the group of $NH_4OH$, $H_2O_2$, HF, $HNO_3$, $H_3PO_4$, HCl, $H_2SO_4$, buffered HF, and isopropyl alcohol; stripping agents; organic solvents; surfactant solutions; pure water; photoresists; developers; CMP slurries; and anti-reflective solvents used for Anti-Reflective Coatings or Top anti-Reflection, and
   an anti-airlock apparatus for filters comprising,
   a process bath for processing wafers,
   a filtration unit incorporating a filter for preliminarily filtering the process solution before said processing and connected with a first deaeration line, and
   a tank body having a determined volume provided on the primary side of the filtration unit and connected with a second deaeration line,
   wherein at least said filtration unit and tank body are connected with each other via a pipeline, and said first and second deaeration lines are separately operated and are directly connected with the most upstream side of the process solution.

9. An anti-airlock apparatus for filters according to claim 1, wherein said process bath has a volume of 40 L and runs at a circulation flow rate of 20 L/min.

10. An anti-airlock apparatus for filters according to claim 9, wherein with the pipeline has a diameter of ¾ inch.

11. An anti-airlock apparatus for filters according to claim 10, wherein the tank body has dimensions of 165 mm in the diameter of the bottom face and 350 mm in height.

12. An anti-airlock apparatus for filters according to claim 11, wherein the deaeration lines have a diameter of ¼ inch.

13. An anti-airlock apparatus for filters according to claim 1, wherein the filtration unit and tank body comprise at least one of polypropylene, polyethylene and Teflon.

14. An anti-airlock apparatus for filters according to claim 1, wherein said pipelines comprise Teflon.

* * * * *